United States Patent [19]
Van Maarion et al.

[11] 4,261,297
[45] Apr. 14, 1981

[54] ANIMAL PROCESSING SYSTEM AND CUTTING GATE

[76] Inventors: Eric Van Maarion, Box 83; Jacob Van Maarion, Box 408, both of Crossfield, Alberta, Canada

[21] Appl. No.: 36,152

[22] Filed: May 4, 1979

[30] Foreign Application Priority Data

May 17, 1978 [CA] Canada ................................. 303536

[51] Int. Cl.³ ...................... A01K 29/00; E01F 13/00
[52] U.S. Cl. .................................................... 119/155
[58] Field of Search ................... 119/149, 155; 49/40, 49/41, 49, 381

[56] References Cited

U.S. PATENT DOCUMENTS

| | | | |
|---|---|---|---|
| 475,556 | 5/1892 | Hale | 49/49 X |
| 2,585,152 | 2/1952 | Merchant | 119/155 |
| 3,072,099 | 1/1963 | Stevens | 119/155 |
| 3,955,322 | 5/1976 | Call, Jr. | 49/40 |
| 4,136,641 | 1/1979 | Hoffman | 119/155 |

*Primary Examiner*—Gene Mancene
*Assistant Examiner*—Robert P. Swiatek

[57] ABSTRACT

The invention relates to a cutting gate, adapted to be utilized in the grading or separating of animals such as horses, cows or the like, into two or more holding corrals. The gate according to the invention comprises a first substantially vertical elongate member adapted to be rotatably mounted about a supporting post or standard; two diverging substantially vertical side portions fixedly attached to the first member, to extend radially therefrom and a third forwardly facing side extending between the diverging side portions remote from the first member to define a space, generally triangular in plan. The gate, which is controllable by an operator positioned within the space, is adjustable in height to ensure adequate ground clearance and additional stops may be provided to limit the rotation of the gate about its support. The invention further contemplates the utilization of the novel cutting gate in conjunction with an animal receiving chute and two or more holding pens or corrals. The gate is positioned so that it may be swung from a first position wherein the gate blocks the chute, to a second position wherein animals may be passed to a selected one of the pens or corrals.

14 Claims, 8 Drawing Figures

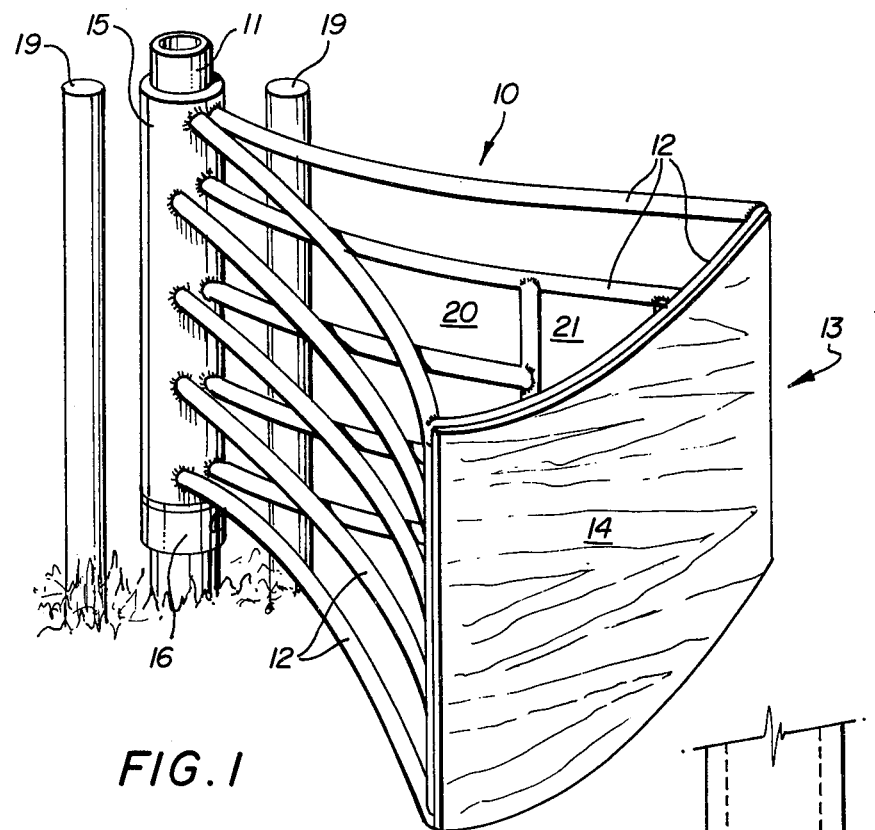
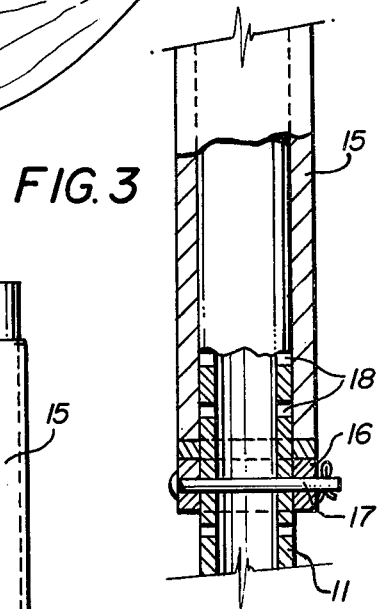
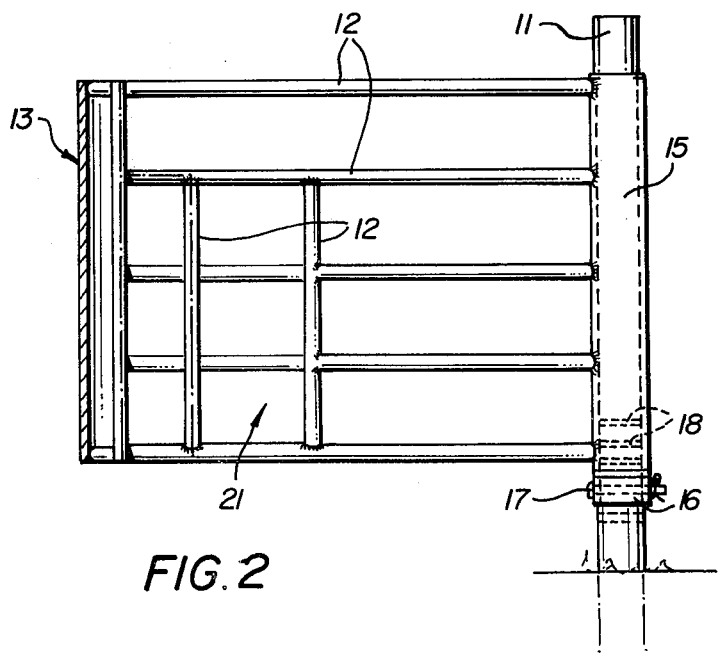

ANIMAL PROCESSING SYSTEM AND CUTTING GATE

BACKGROUND OF THE INVENTION

The invention relates to an improved structure for handling cows, horses or the like, and more particularly to a cutting gate and corral system, the use of which permits the grading and separating of animals with ease and safety.

BRIEF SUMMARY OF THE INVENTION

The improved cutting gate according to the invention comprises a gate supporting post adapted at its lower extremity to be engaged with the ground; an open, three sided, space enclosing framework mounted for rotation about the post, this framework including a first member, slidably mounted on the post and adapted for rotation about the longitudinal axis thereof; first and second substantially rectangular, longitudinally extending side sections, equal in length, each being fixedly attached along one vertical edge to the first member and extending radially therefrom in diverging relation one to the other, and a third substantially rectangular forward facing side section extending between the first and second side sections, as an extension thereof, remote from the first member; and gate positioning means on the post adjacent the lower extremity thereof, adapted to engage and support the gate in spaced relation to the ground.

The invention further comprises an animal handling system comprising an animal receiving chute; a plurality of animal holding pens or corrals co-extensive with one end of the chute; a gate supporting post, adapted at its lower end to be engaged with the ground, the post being positioned substantially centrally of the chute adjacent the one end; gate means, mounted for rotation about the post from a first operating position wherein the gate means blocks passage through the chute, to a second operating position whereby animals may pass to a selected one of pens or corrals; the gate means including: a first member, slidably mounted on the post and adapted for rotation about the longitudinal axis thereof; an open, three sided space enclosing framework, generally triangular in plan, fixedly attached at its apex to the first member to extend normally and outwardly thereof; and gate positioning means on the post adjacent the lower end thereof, adapted to engage and support the gate means in spaced relation to the ground.

BRIEF DESCRIPTION OF THE DRAWINGS

The invention will now be described, by way of example only, reference being had to the accompanying drawings in which:

FIG. 1 is a perspective view of the cutting gate according to the invention in its preferred form;

FIG. 2 is a side view of the gate according to FIG. 1, in partial section;

FIG. 3 is a fragmentary, partly sectional view of the gate supporting structure, according to FIGS. 1 and 2;

DESCRIPTION OF THE PREFERRED EMBODIMENTS

Figure 4:
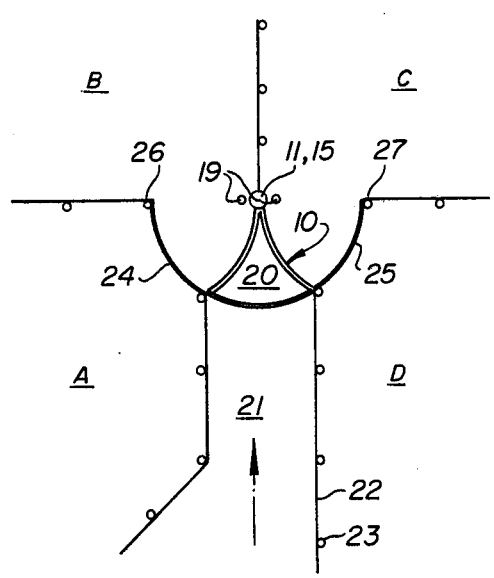
FIGS. 4 through 8 disclose schematically, the system according to the invention, the improved cutting gate of FIGS. 1-3 being utilized in conjunction with four holding corrals.

With reference to the drawings in which, for ease of understanding, similar reference numerals have been used to indicate corresponding components in all figures, the cutting gate 10 in its preferred form can be seen to be generally triangular in plan and adapted to be pivotably supported for axial rotation about a supporting post or standard 11, circular in transverse cross-section and mounted to extend vertically from the ground. Gate 10 of necessity, had to be rugged and of lightweight construction in order to achieve maximum mobility in operation. In the preferred embodiment, the gate comprises a substantially triangular framework of tubular members 12 having two open sides formed from a plurality of longitudinally extending members 12, and base, or forwardly facing side 13, again formed by means of a framework of tubular members 12 but provided with a covering member 14, in this example a plywood panel, fixedly attached to members 12. The purpose of this panel will be described hereafter when discussing the system of the present invention.

The members 12 of each open side are attached at their forward ends, as by welding, to the framework of the forwardly facing side, and at their opposite ends to member 15 which for the sake of this description can be considered to constitute the apex of the generally triangular gate construction.

Member 15 is an elongate vertically oriented component, circular in transverse cross-section and provided with a central, longitudinally extending bore, the diameter of which is such to permit slidable mounting upon post 11 and free axial rotation thereon.

Since the lower end of post 11 is permanently mounted in the ground, and it is necessary for the gate to be freely rotatable, means must be provided to keep the gate 10 from contacting the ground. In the preferred embodiment, such means consist in a stop 16 (FIGS. 1-3) in the form of an annular collar 16 releasably held in position by means of a pin 17 which extends through the collar 16 and post 11. As will be appreciated, the surface of the ground may become disturbed by the continual passage of animals, or by reason of prevailing weather conditions, and it may be necessary to adjust the height of the gate 10 on its supporting post to ensure freedom of movement. As can be seen from FIGS. 2 and 3, holes 18 are provided through post 11 at various spaced, vertical locations, the diameter of these holes being such as to readily accommodate pin 17. Therefore, to adjust the operating height of the gate, it is merely necessary to slide the gate upwardly on post 11, temporarily supporting the gate in the upper position; unpin collar 16; slide collar upwardly and re-locate pin 17 in the appropriate hole 18. Thereafter, gate 10 is returned to its resting position upon collar 16.

In the system according to the invention, it is necessary to provide means, external of the gate, to limit the rotation thereof. FIG. 1 depicts these additional stops as upright posts 19 vertically mounted from the ground adjacent each side of post 11. The positioning of these posts 19, will obviously depend upon the amount of rotation required in the operation of the gate 10.

Finally, some mention should be made regarding the manner in which the gate according to the invention is manipulated. While this could be achieved in a number of ways, it is preferred that the operator stands within the triangle, in the space provided and indicated at 20.

To facilitate entry, an opening generally indicated at 21 on FIGS. 1 and 2 is provided, vertical members 12 being introduced on either side of the opening to ensure that the rigidity of the structure is maintained.

To describe the system according to the subject invention, reference is directed to FIGS. 4 through 8, which show the novel cutting gate being utilized to grade or separate animals from a delivery chute 21, into a number of holding corrals, in this example four, indicated by letters A, B, C and D.

In the four-corral arrangement schematically depicted, conventional fencing is shown, consisting of fences 22, and posts 23. Cutting gate 10 is effectively positioned at the junction between the openings into corrals A through D. In the disclosed four-corral system, two separate gates or closure means 24 and 25 are additionally required, hingably mounted on posts 26 and 27 respectively. Movement of gate 24 will affect closure of either corral A or B, and movement of gate 25 will affect closure of either corral C or D.

In the preferred arrangement, the members constituting the sides of cutting gate 10 are curved, the forwardly facing side having a convex curvature, the two adjacent sides being provided with a concave curvature. To complement such a curved structure, it is preferred that gates 24 and 25 be also of a similar curved profile. While this is of practical significance since it avoids unnecessary restriction of the through-passage, it is within the scope of the invention to construct and utilize a gate 10 with straight sides.

The operation of the system according to the invention is clearly shown by FIGS. 4 through 8. FIG. 4 shows the cutting gate 10 in its initial operating position in which it blocks chute 21, gates 24 and 25 being positioned so as to close-off corrals A and D respectively.

Prior to each selected cutting operation, gate 10 is preferably returned to the position shown in FIG. 4, in this position, the operator in space 20 can readily manipulate gates 24 and 25 to either closure position.

Figure 6:
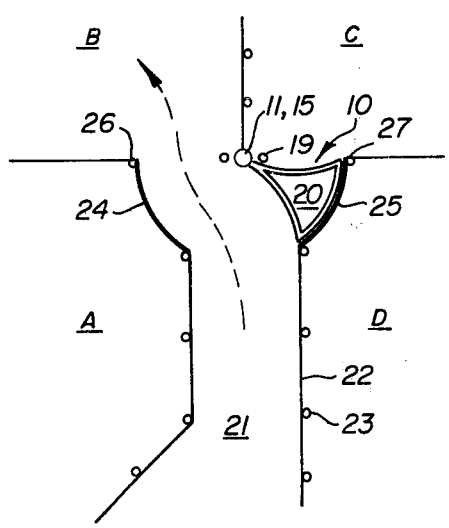

To permit passage of animals into corral B, reference is made to FIG. 6, where it can be seen that gate 10 has been rotated about post 11 so as to block corral C, gates 24 and 25 remain in the position previously shown in FIG. 4.

Figure 5:
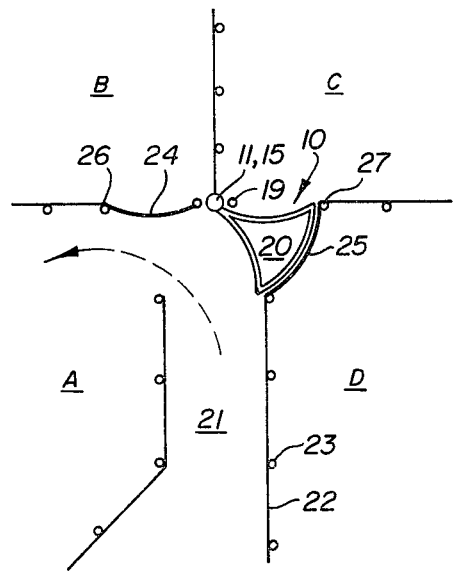

To cut selected animals into corral A, the operator firstly swings gate 24 into the position shown in FIG. 5, thus closing-off corral B, then rotates gate 10 such that entry into corral C is blocked.

Figure 7:
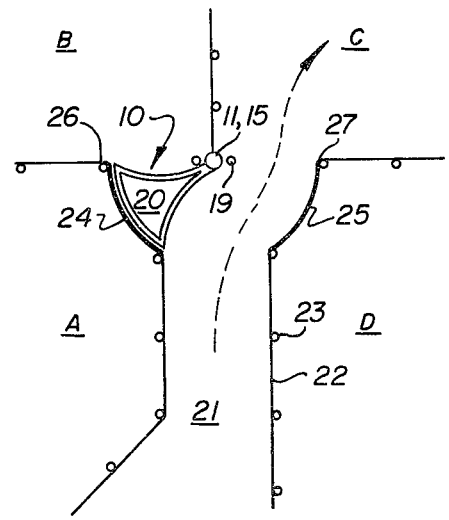

To cut selected animals into corral C, the operator has to ensure gates 24 and 25 are blocking entry into corrals A and D, following which, gate 10 may be rotated into the position shown in FIG. 7.

Figure 8:
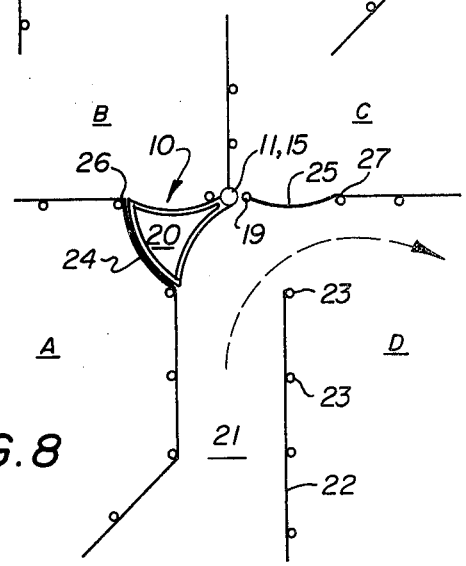

Finally, in order to cut selected animals into corral D, the operator firstly positions gate 25 such that entry into corral C is blocked, then rotates gate 10 into the position shown in FIG. 8. Gate 24 being left in either of its positions as shown in FIGS. 4 or 5.

Thus, it can be seen that one operator, in space 20, can effectively control the cutting and corralling procedure with safety, it requiring only one other person to drive the animals through the chute 21.

As mentioned previously, it is preferable that gate 10 be provided at its forwardly facing side 13 with a solid member 14, the reason being that such a member or panel will significantly reduce the animals vision of the operator as it approaches the gate and thus avoid the possibility of a partially wild animal from charging the gate in an attempt to attack the operator. It being further understood that the gate according to the invention may be constructed entirely from solid rectangular panels, instead of the tubular structure referred to above.

Finally, while the above description has exemplified the use of the novel cutting gate in a four-corral system, it is to be understood that such a gate can be utilized in conjunction with any practical number of corrals, it being only necessary to enlarge the physical diameters of the gate and add or subtract additional gates 24 and 25 as may be deemed necessary.

Further modifications and alternative embodiments of the invention will be apparent to those skilled in the art in view of the foregoing description. Accordingly, this description is to be construed as illustrative only and is for the purpose of teaching those skilled in the art the manner of carrying out the invention. It is further understood that the form of the invention herewith shown and described is to be taken as the presently preferred embodiment. Various changes may be made in the shape, size and general arrangement of components. For example, equivalent elements may be substituted for those illustrated and described herein, parts may be used independently of the use of other features, all as will be apparent to one skilled in the art after having the benefits of the description of the invention and the appended claims.

What is claimed is:

1. An animal handling system comprising:
   (1) an animal receiving chute;
   (2) a plurality of animal holding pens or corrals having entrances adjacent one end of said chute;
   (3) a gate supporting post, adapted at its lower end to be engaged with the ground, said post being positioned substantially centrally of said chute adjacent said one end;
   (4) gate means mounted for rotation about said post from a first operating position wherein said gate means blocks passage through said chute, to second and third positions whereby animals may pass to a selected one of said pens or corrals; said gate means including:
   (a) a first member, slidably mounted on said post and adapted for rotation about the longitudinal axis thereof;
   (b) an open, three-sided space-enclosing framework, generally triangular in plan, fixedly attached at its apex to said first member to extend normally and outwardly thereof; and
   (5) gate positioning means on said post adjacent the lower end thereof, adapted to engage and support said gate means in spaced relation to the ground.

2. The system according to claim 1 further including stop means positioned adjacent said post, on each side thereof, said stop means adapted to engage with said gate means to limit rotational movement thereof about said post.

3. The system according to claim 2 wherein said stop means comprise vertical posts, spaced apart from said gate supporting post.

4. The system according to claim 1 wherein said framework comprises first and second generally rectangular longitudinally extending side sections, equal in length and dimensioned so as to block passage through selected ones of said entrances when in said second and third positions, each being fixedly attached along one vertical edge to said first member and extending radially therefrom in diverging relation one to the other, and a third generally rectangular forward facing side section extending between said first and second side sections and of sufficient lateral extent as to block passage through said chute when in said first operating position.

5. The system according to claim 4, wherein each of said three side sections is curved in the longitudinal direction, said first and second sides being of concave curvature inwardly with respect to said enclosed space, and said third side being of convex curvature outwardly with respect to said enclosed space.

6. The system according to claim 4 wherein said framework is constructed of tubular members.

7. The system according to claim 6 wherein said forward facing side section includes a solid opaque panel fixedly attached to the outer surface thereof.

8. The system according to claim 1 or claim 7 wherein said gate means is manually operated by an operator positioned within said enclosed space, means being provided in said framework to effect entry thereto.

9. The system according to claim 1 wherein said gate positioning means are releasably attached to said post to permit the location of the gate to be adjustable thereon.

10. The system according to claim 1 wherein the number of animal holding pens or corrals associated with said system exceeds three, and wherein one or more gates of a conventional type are located adjacent said gate means to be operable in conjunction therewith in order to achieve the passage of said animals to a selected one of said three or more pens or corrals.

11. An animal cutting gate for use in association with an animal receiving chute leading to two or more animal holding pens or corrals having adjacent entrances, said gate comprising:

(a) a gate support post, adapted at its lower extremity to be engaged with the ground;

(b) an open, three-sided space-enclosing framework mounted for rotation about said post, said framework including:

(i) a first member slidably mounted on said post and adapted for rotation about the longitudinal axis thereof;

(ii) first and second generally rectangular, longitudinally extending side sections, equal in length, each being fixedly attached along one vertical edge to said first member and extending radially therefrom in diverging relation one to the other so as to be capable in use of closing one or the other of the entrances, and a third substantially rectangular forward facing side section extending between said first and second side sections, as an extension thereof, remote from said first member so as to be capable in use of closing the chute; and (c) gate positioning means on said post adjacent the lower extremity thereof, adapted to engage and support said gate in spaced relation to the ground.

12. A gate according to claim 11 wherein said gate positioning means are releasably attached to said post to permit the location of the gate to be adjustable thereon.

13. A gate according to claim 12 wherein each of said three side sections is curved in the longitudinal direction, said first and second sides being of concave curvature inwardly with respect to said enclosed space, and said third side being of convex curvature outwardly with respect to said enclosed space.

14. A gate according to claim 11 wherein said sections of said framework are rigid and fixed relative to each other.

* * * * *